(12) United States Patent
Kaplan

(10) Patent No.: US 7,780,942 B2
(45) Date of Patent: Aug. 24, 2010

(54) METHOD OF OPTIMIZING THE OPERATION OF CLAUS UNITS

(75) Inventor: Pierre Kaplan, Beaumont, TX (US)

(73) Assignee: Total Raffinage Marketing, Puteaux (FR)

( * ) Notice: Subject to any disclaimer, the term of this patent is extended or adjusted under 35 U.S.C. 154(b) by 0 days.

(21) Appl. No.: 12/279,297

(22) PCT Filed: Feb. 19, 2007

(86) PCT No.: PCT/FR2007/000298

§ 371 (c)(1),
(2), (4) Date: Aug. 13, 2008

(87) PCT Pub. No.: WO2007/096512

PCT Pub. Date: Aug. 30, 2007

(65) Prior Publication Data

US 2009/0226363 A1    Sep. 10, 2009

(30) Foreign Application Priority Data

Feb. 27, 2006  (FR) .................................. 06 01691

(51) Int. Cl.
*C01B 17/04* (2006.01)
*G05D 23/00* (2006.01)

(52) U.S. Cl. ........... 423/574.1; 423/576.2; 423/DIG. 6; 422/105; 422/168; 422/169; 422/170; 422/171; 422/177; 422/180

(58) Field of Classification Search ............ 423/574.1, 423/576.2, DIG. 6; 422/105, 168–171, 177, 422/180

See application file for complete search history.

(56) References Cited

U.S. PATENT DOCUMENTS

| 3,477,810 A | 11/1969 | Palm et al. |
| 4,988,494 A | 1/1991 | Lagas et al. |

FOREIGN PATENT DOCUMENTS

| DE | 34 03 651 A1 | 8/1985 |
| SU | 1 433 891 A1 | 10/1988 |
| WO | 2005/007570 A2 | 1/2005 |

OTHER PUBLICATIONS

The English abstract of Soviet Union patent document 1,433,891 A published Oct. 1988.*

* cited by examiner

*Primary Examiner*—Timothy C Vanoy
(74) *Attorney, Agent, or Firm*—Sughrue Mion, PLLC

(57) ABSTRACT

A catalytic method for treating an $H_2S/SO_2$ mixture for producing liquid sulphur including the following steps: a) at least one step of heating the mixture containing $H_2S/SO_2$ to a temperature Tc; b) at least one step of catalytically reacting the heated mixture obtained in a) in the presence of at least one catalyst and at least one step of recovering the exiting mixture containing gaseous sulphur; and c) at least one step of converting the gaseous sulphur contained in the exiting mixture obtained at step b) into liquid sulphur, wherein between step b) and step c), the temperature Ts of said exiting mixture and the dew point Tr of the gaseous sulphur contained in said exiting mixture are measured and in that the heating temperature Tc of step a) is adjusted so that the temperature Ts is 5° C. to 30° C. above the dew point Tr.

6 Claims, 1 Drawing Sheet

METHOD OF OPTIMIZING THE OPERATION OF CLAUS UNITS

The present invention relates to the oil and gas industries and more particularly to units for the production of liquid sulfur known as Claus units.

The desulfurization of oil converts organic sulfur compounds to hydrogen sulfide $H_2S$, the toxicity and dangers of ignition of which are well known. $H_2S$ is also one of the constituents of natural gas and it acts as a poison which deactivates the industrial catalysts employed in processes for enhancing natural gas in value. It is therefore essential to convert hydrogen sulfide to nontoxic elemental sulfur which is also a useful starting material. This is because the sulfur produced is generally of good purity and can be sold as is or in the form of sulfuric acid $H_2SO_4$.

Industrially, this conversion is carried out in a refinery using a process based on the Claus technology. As the degrees of recovery generally achieved are approximately 95%, the flue gases emitted by these plants generally include not insignificant amounts of acid gases, particularly $H_2S$ and $SO_2$. This makes it necessary to treat these residual gases with the aim of making it possible to discharge them into the atmosphere after incineration while observing the increasingly strict standards laid down by legislation with regard to atmospheric pollution, both in France and at the European and world level, where the tendency is to set an efficiency of 99.5% for the final recovery of the sulfur. It is thus easily seen that the additional treatments of tail gases which make it possible to achieve these high yields generate very high additional economic and energy costs, thus making it essential to improve the levels of recovery achieved by Claus units.

The Claus process is generally a two-stage process. A first combustion stage is carried out by incinerating a third of the $H_2S$ in a first chamber equipped with a boiler. During this thermal stage, a third of the $H_2S$ is partially oxidized to $SO_2$ by air and/or oxygen (I). This reaction (I) is a complete reaction and stops when all the oxygen is consumed. In a second step, the sulfur dioxide $SO_2$ thus formed reacts with the remaining $H_2S$ to form gaseous sulfur and water according to the Claus reaction (II). This reaction is an equilibrium reaction and the equilibrium constant depends essentially on the temperature. The overall chemical reactions involved are as follows:

$$H_2S + 3/2 O_2 \rightarrow SO_2 + H_2O \quad (I)$$

$$2H_2S + SO_2 \leftrightarrow 3/n S_n + 2H_2O \quad (II)$$

At this stage, the reaction stops and most of the gaseous sulfur is produced (approximately 70%). The reaction products are generally cooled in a condenser in order to recover, in the liquid form, the elemental sulfur vapors which have formed in the combustion chamber and in the boiler.

The gas mixture, which comprises residual $H_2S$ and $SO_2$ in an $H_2S/SO_2$ molar ratio of two, is then subjected to a catalytic reaction stage (II). In practice, the unit generally comprises a sequence of catalytic reactors in series, each of them being associated with a system for reheating the gas and with a sulfur condenser.

As the Claus reaction is exothermic, the conversion to sulfur is promoted by low temperatures. Nevertheless, it is necessary to maintain the temperature of the catalytic reactor at a satisfactory level, not only to promote the kinetics of the Claus reaction but in particular to prevent the appearance of liquid sulfur dew at the surface of the catalysts, which would bring about their deactivation.

Thus, it is necessary for the set temperature laid down at the inlet of the catalytic reactor, recorded as $T_s$ in the present invention, to be adjusted so that the outlet temperature of the catalytic reactor, recorded as To, is greater than the dew point temperature of the sulfur at the outlet of said reactor, recorded as Td in the present invention. Moreover, this applies to each of the catalytic reactors which may be included in the Claus unit. Ts is adjusted in an empirical manner known to a person skilled in the art, so that To takes the desired value.

In point of fact, the dew point temperature of sulfur is unknown as it depends, inter alia, on the composition of the gas, which changes as the reaction proceeds. This is why the procedure is generally to adjust the temperature Ts to a very high level in order to have available a safety margin with regard to the temperature at which this dew point appears. The set temperature is thus generally adjusted so that the temperature To is several tens of degrees Celsius higher than the temperature Td expected at the outlet of this same reactor. This technique has the major inconvenience of being disadvantageous from an economic and environmental viewpoint because, as the operation of the unit is not optimized, the conversion rate to give sulfur is not sufficiently satisfactory, which is reflected by residual gases laden with acid gases (more particularly $H_2S$ and $SO_2$) which require a more substantial additional treatment.

Several processes and methods have been provided for going further into the levels of recovery of the sulfur but none has sought to solve the problem consisting of operating as close as possible to the dew point. Refiners only know the technique which consists in carrying out a campaign of sampling the various gases in the Claus unit and performing a material balance in order to deduce the temperature of the dew point therefrom.

The disadvantage of such a technique is that it requires a team of specialists and that the measurement is only occasional. Thus, there exists a need in the art for an exact as possible, in situ and continuous determination of the dew point of the sulfur in order to reduce the difference (To−Td) between the outlet temperature of the catalytic reactor and the dew point temperature of the sulfur.

The Applicant intends to provide a technical solution which makes it possible to operate as close as possible to the dew point due to its continuous measurement, to optimize the temperatures of the reactors and to thus increase the efficiency of the Claus unit.

To this end, the invention provides a catalytic process intended to treat a mixture of $H_2S$ and of $SO_2$ in order to produce liquid sulfur, said process comprising the following stages:
  a) at least one stage of heating the mixture comprising the $SO_2$ and the $H_2S$ to a temperature Ts,
  b) at least one stage of catalytically reacting the heated mixture obtained in a) in the presence of at least one catalyst and at least one stage of recovering the outlet mixture comprising gaseous sulfur,
  c) at least one stage of converting the gaseous sulfur present in the outlet mixture obtained in stage b) to liquid sulfur, said process being characterized in that, between stage b) and stage c), the temperature To of said outlet mixture and the dew point temperature Td of the gaseous sulfur present in said outlet mixture are measured, and in that the heating temperature Ts of stage a) is adjusted so that the temperature To is greater than the dew point temperature Td by 5° C. to 30° C.

To this end, another subject matter of the invention is a device for the implementation of the process according to the invention, characterized in that it makes it possible to measure the dew point temperature of the sulfur.

The invention exhibits several advantages, including the optimization of the operation of the Claus unit and the reduction in the amount of untreated residual sulfur-comprising entities, in particular $H_2S$ and $SO_2$. Thus, the size of the additional treatment units for the residual gases is also optimized, resulting in an additional energy and economic saving. Moreover, the invention is not only applicable to new units but also to pre-existing units, which can significantly reduce the maintenance operating costs of the latter.

Advantageously, the heating temperature Ts of stage a) is adjusted so that said temperature To is greater than the dew point temperature Td by 5° C. to 20° C. and more advantageously by 5° C. to 10° C.

According to the invention, this process is such that it is carried out in at least one Claus unit catalytic reactor and preferably in at least two Claus unit catalytic reactors.

According to another characteristic of the invention, the device for the implementation of the process according to the invention comprises a calorimetric or magnetic probe.

BRIEF DESCRIPTION OF THE DRAWING

The invention will be better understood on reading the detailed description of various embodiments taken in conjunction with the drawing, in which.

Figure 1:
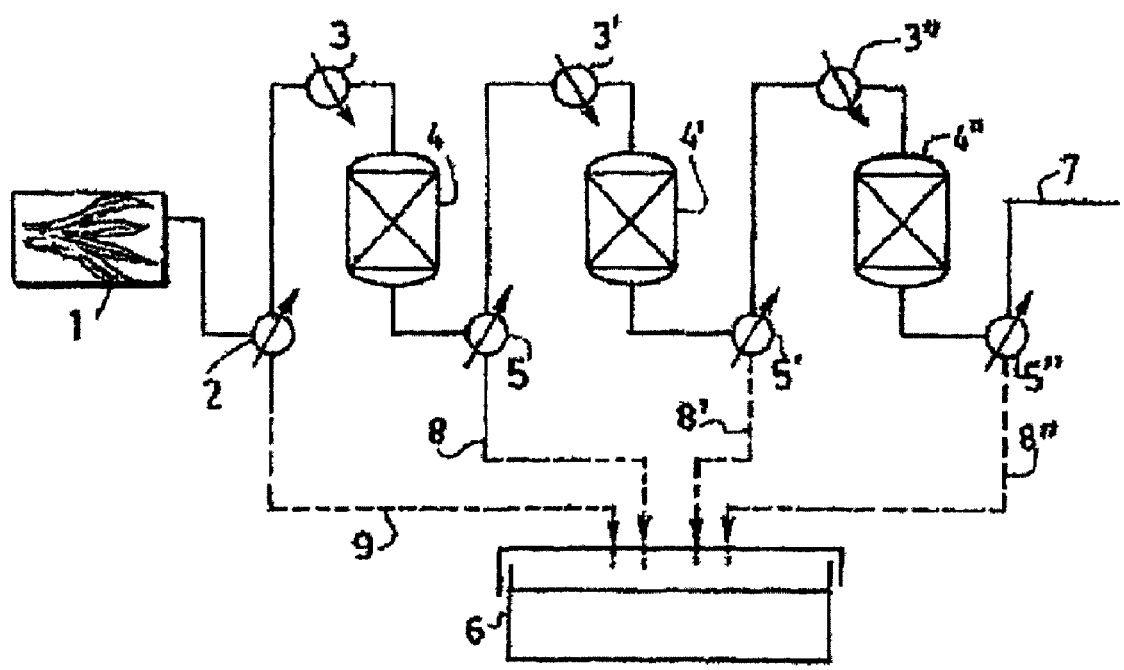
FIG. 1 is a representative diagram of a Claus unit according to the present invention showing a thermal stage ($S_0$) and three catalytic stages ($S_1$, $S_2$, $S_3$) in series.

The first stage of combustion of the $H_2S$ takes place in a first chamber equipped with a boiler 1. During this thermal stage, a third of the $H_2S$ is partially oxidized to $SO_2$ with air and/or oxygen. The sulfur dioxide $SO_2$ thus formed reacts with the remaining $H_2S$ to form gaseous sulfur and water according to the Claus reaction (II). The combustion products are cooled in a condenser 2 in order to recover, in the liquid form, via the line 9, elemental sulfur vapors which were formed in the combustion chamber and in the boiler.

The residual gas mixture, comprising the unreacted $H_2S$ and $SO_2$, is subjected to several stages of catalytic reaction (II). A section of first catalytic stage ($S_1$) comprises the reheating of the Claus gas by a reheater 3, the catalytic conversion proper in a reactor 4 and the cooling and condensation of the sulfur in a condenser 5. This stage also generally participates in the hydrolysis of COS and $CS_2$, undesirable compounds formed upstream. This is made possible by operating the reactor at a temperature which is sufficiently high to promote the hydrolysis at the expense of poorer conversion of the sulfur at this stage. Two additional catalytic stages ($S_2$, $S_3$), respectively comprising reheating by reheaters 3' and 3", conversion over a catalyst in reactors 4' and 4" and condensation of sulfur by condensers 5' and 5", complete the device, thus making it possible to continue the Claus reaction.

The sulfur is recovered in the liquid state by condensation after each reaction stage via the lines 8, 8' and 8", corresponding to the reactors 4, 4' and 4". In the case represented in the FIGURE, the invention is implemented in at least one of the reactors 4, 4' or 4". The process according to the invention is such that it is implemented in one, two or three of these reactors. The sulfur recovered can be stored either in the liquid form in tanks maintained at 140° C. or in the solid form in a tank 6. With regard to the combined residual sulfur-comprising components exiting via a line 7 after passing through the condenser 5", the latter are either directed to a residual gas treatment unit or converted to $SO_2$ before being discharged into the atmosphere.

The essential characteristic of the process according to the invention is that the temperature To of the outlet mixture from a catalytic reactor in which stage b) is implemented and the dew point temperature Td of the gaseous sulfur present in said outlet mixture are measured and the heating temperature Ts is adjusted so that the temperature To is greater than the dew point temperature Td by 5° C. to 30° C., advantageously by 5° C. to 20° C. and more advantageously by 5° C. to 10° C.

According to the invention, this process is such that it is implemented in at least one catalytic reactor of the Claus unit.

According to another form, the process according to the invention is such that it is implemented in at least two catalytic reactors of the Claus unit. In this case, it is generally more advantageous to adjust the temperature Ts of the last two reactors. This is because, as is indicated above, the first catalytic reactor generally operates at a temperature which is sufficiently high to promote the hydrolysis of compounds such as COS and $CS_2$. Nevertheless, the present invention does not exclude an embodiment according to which the process is such that it is implemented in all the catalytic reactors of the Claus unit.

The invention is also targeted at a device for the implementation of the catalytic process according to any one of the preceding claims which is intended to treat a mixture of $H_2S$ and $SO_2$ in order to produce liquid sulfur, said device comprising the following means:

at least one means for heating the mixture comprising the $SO_2$ and the $H_2S$ to a temperature Ts;

at least one means for catalytically reacting the heated mixture obtained at the outlet of the heating means in the presence of at least one catalyst and at least one means for recovering an outlet mixture comprising gaseous sulfur;

at least one means for converting the gaseous sulfur present in the outlet mixture to liquid sulfur, said device being characterized in that it makes it possible to measure the dew point temperature of the sulfur.

According to a first embodiment, said device comprises a calorimetric probe. According to a second embodiment, said device comprises a magnetic probe.

A conventional method for measuring the dew point consists in cooling an appropriate surface until dew appears, in detecting the moment dew appears and in then measuring the temperature corresponding to the moment of the first appearance of the deposit of dew. Various manual or automatic devices make it possible to measure the dew point temperature. They may use calorimetric, magnetic, optical or capacitive detection in order to monitor the dew on this surface. Patent EP 542 582 describes some embodiments of such a probe for measuring the dew point.

Advantageously, the device for measuring the dew point according to the process of the invention is a calorimetric or magnetic probe for measuring the dew point.

EXAMPLES

The following examples illustrate the invention and its advantages without, however, limiting the scope thereof.

The operation is carried out in a sulfur unit as represented in the appended FIGURE, composed of three catalytic stages ($S_1$, $S_2$, $S_3$). The catalyst used is titanium oxide $TiO_2$. The incoming stream is 100 T/day of acid gas having the following molar composition: hydrocarbons=1%; $H_2S$=87%; $CO_2$=8.7%; $H_2O$=3.3%. Thus, the incoming sulfur flow rate is 81.5 T/d.

The set temperature for the first catalytic stage is arranged so that the outlet temperature of this first reactor 4 is equal to 310° C.

In order to demonstrate the specific advantages of the improved process of the invention, the dew point temperature at the outlet of the catalytic reactor(s) 4' and/or 4" is measured and the set temperature(s) of the reheaters 3' and/or 3" is/are adjusted.

The condenser 2 is regulated at 170° C. while the condensers 5, 5' and 5" are regulated at 135° C.

Example 1

In a first step, only the set temperature of the second reactor 4' is adjusted so as to vary the margin between the outlet temperature of this second reactor and the dew point temperature measured at its outlet. The set temperature for the reheater of the final reactor 4" is arranged so that the margin ($To_3-Td_3$) is equal to 60° C. The results obtained are combined in table 1.

TABLE 1

| Margin ($To_2 - Td_2$) | $Ts_2$ | $To_2$ | $Td_2$ | Overall yield | Reduction in the $SO_2$ emissions (%) | Charge of the tail gas unit (T eq. S/d) |
|---|---|---|---|---|---|---|
| 60 | 244 | 259 | 199 | 97.6 | / | 1.94 |
| 30 | 220 | 223 | 163 | 98.0 | 16.8 | 1.61 |
| 20 | 205 | 225 | 205 | 98.2 | 22.7 | 1.50 |
| 10 | 195 | 216 | 206 | 98.3 | 28.2 | 1.39 |
| 5 | 190 | 211 | 207 | 98.4 | 31.1 | 1.34 |

The above example shows that the more the margin between the outlet temperature of the second reactor 4' and the dew point temperature measured is reduced, the greater the overall yield obtained. This is reflected by the reduction in the $SO_2$ emissions and in the residual charge to be treated in the tail gas unit.

Thus, regulating the second reheater 3' at 244° C. corresponds to a dew point margin of 60° C. at the outlet of the second reactor. Regulating differently with a margin of 5° C., for example, with respect to the dew point, would result in the temperature of the second reheater being arranged at 190° C. and would reduce the $SO_2$ emissions by 31.1% due to an overall yield of 98.4%. The residual charge to be treated in the tail gas unit is reduced from 1.94 T/d to 1.34 T/d.

Example 2

In this example, it is the set temperature of the third reactor 4" which is adjusted so as to vary the margin between the outlet temperature of this reactor and the dew point temperature measured. The set temperature for the reheater of the second reactor is arranged so that the margin ($To_2-Td_2$) is equal to 60° C. The results obtained are combined in table 2.

TABLE 2

| Margin ($To_3 - Td_3$) | $Ts_3$ | $To_3$ | $Td_3$ | Overall yield | Reduction in the $SO_2$ emissions (%) | Charge of the tail gas unit (T eq. S/d) |
|---|---|---|---|---|---|---|
| 60 | 227 | 232 | 172 | 97.6 | / | 1.94 |
| 30 | 202 | 209 | 179 | 98.2 | 25.6 | 1.44 |
| 20 | 193 | 201 | 181 | 98.4 | 33.2 | 1.30 |
| 10 | 184 | 192 | 182 | 98.6 | 40.8 | 1.15 |
| 5 | 179 | 188 | 183 | 98.7 | 44.5 | 1.08 |

More importantly, when the difference ($To_3-Td_3$) decreases, the overall yield obtained is greater. Thus, regulating the third reheater at 227° C. corresponds to a dew point margin of 60° C. at the outlet of this same reactor, whereas regulating differently with a margin of 5° C., for example, with respect to the dew point, would result in the temperature of the third reheater (3") being arranged at 179° C. and would reduce the $SO_2$ emissions by 44.5% due to an overall yield of 98.7%. The residual charge to be treated in the tail gas unit is reduced from 1.94 T/d to 1.08 T/d.

Example 3

In this example, the set temperatures of the second reactor and of the third reactor are simultaneously adjusted so as to vary the margin between the outlet temperature of these reactors and the dew point temperature measured. The results obtained are combined in table 3.

TABLE 3

| Margin ($To_2 - Td_2$) | $Ts_2$ | $To_2$ | $Td_2$ | Margin ($To_3 - Td_3$) | $Ts_3$ | $To_3$ | $Td_3$ | Overall yield | Reduction in the $SO_2$ emissions (%) | Charge of the tail gas unit (T eq. S/d) |
|---|---|---|---|---|---|---|---|---|---|---|
| 60 | 244 | 259 | 199 | 60 | 227 | 232 | 172 | 97.6 | / | 1.94 |
| 30 | 215 | 234 | 204 | 30 | 196 | 201 | 171 | 98.0 | 37.0 | 1.22 |
| 20 | 205 | 225 | 205 | 20 | 185 | 190 | 170 | 98.7 | 46.6 | 1.04 |
| 10 | 195 | 216 | 206 | 10 | 174 | 178 | 168 | 98.9 | 55.5 | 0.86 |
| 5 | 190 | 211 | 207 | 5 | 169 | 173 | 168 | 99.0 | 59.2 | 0.79 |

The above example shows that the optimization of the heating temperatures of the final two catalytic stages results in a markedly improved overall yield. Thus, regulating the reheaters of the last two reactors 4' and 4" with a margin of 5° C., for example, with respect to the dew point, reduces the $SO_2$ emissions by 59.2% due to an overall yield of 99%. The residual charge to be treated in the tail gas unit is reduced to 0.79 T/d.

What is claimed is:

1. A catalytic process carried out in at least three catalytic reactors connected in a sequence for treating a mixture of $H_2S$ and of $SO_2$ issued from a first combustion stage of a Claus process in order to produce liquid sulfur, said process comprising the following steps:
   a) at least one step of heating the mixture comprising the $SO_2$ and the $H_2S$ to a temperature Ts,
   b) at least one step of catalytically reacting the heated mixture obtained in a) in the presence of at least one catalyst and at least one stage of recovering the outlet mixture comprising gaseous sulfur, c) at least one step of converting the gaseous sulfur present in the outlet mixture obtained in stage b) to liquid sulfur, wherein between step b) and step c) for at least one of the last two catalytic reactors, measuring the temperature To of said outlet mixture and the dew point temperature Td of the gaseous sulfur present in said outlet mixture, and adjusting the heating temperature Ts of step a) so that the temperature To is greater than the dew point temperature Td by 5° C. to 30° C.

2. The process as claimed in claim 1, wherein the heating temperature Ts of step a) is adjusted so that said temperature To is greater than the dew point temperature Td by 5° C. to 20° C.

3. The process as claimed in claim 1, wherein the heating temperature Ts of step a) is adjusted so that said temperature To is greater than the dew point temperature Td by 5° C. to 10° C.

4. A device for the implementation of the catalytic process according to claim 1 in at least three catalytic reactors for treating a mixture of $H_2S$ and $SO_2$ in order to produce liquid sulfur, said device comprising:

at least one means for heating the mixture comprising the $SO_2$ and the $H_2S$ to a temperature Ts;

at least one means for catalytically reacting the heated mixture obtained at the outlet of the heating means in the presence of at least one catalyst and at least one means for recovering an outlet mixture comprising gaseous sulfur;

at least one means for converting the gaseous sulfur present in the outlet mixture to liquid sulfur, and for at least one of the last two catalytic reactors a device for measuring the dew point temperature of the sulfur.

5. The device as claimed in claim 4, wherein the device for measuring the dew point temperature of the sulfur is a calorimetric probe.

6. The device as claimed in claim 4, wherein the device for measuring the dew point temperature of the sulfur is a magnetic probe.

* * * * *